(12) United States Patent
Rastegar

(10) Patent No.: US 10,948,293 B2
(45) Date of Patent: Mar. 16, 2021

(54) POLARIZED RADIO FREQUENCY (RF) ROLL, PITCH AND YAW ANGLE SENSORS AND ORIENTATION MISALIGNMENT SENSORS

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 258 days.

(21) Appl. No.: 15/986,765

(22) Filed: May 22, 2018

(65) Prior Publication Data

US 2018/0340774 A1 Nov. 29, 2018

Related U.S. Application Data

(60) Provisional application No. 62/510,232, filed on May 23, 2017.

(51) Int. Cl.
  *G01C 19/38* (2006.01)
  *G01S 13/88* (2006.01)
  *G01S 5/02* (2010.01)
  *G01S 7/02* (2006.01)
  *G01S 1/04* (2006.01)
  (Continued)

(52) U.S. Cl.
  CPC ............ *G01C 19/38* (2013.01); *G01C 19/48* (2013.01); *G01S 1/045* (2013.01); *G01S 5/0221* (2013.01); *G01S 5/0247* (2013.01); *G01S 7/024* (2013.01); *G01S 13/88* (2013.01)

(58) Field of Classification Search
  CPC ......... G01C 19/38; G01C 19/48; G01S 13/88; G01S 5/0221; G01S 7/024; G01S 5/0247; G01S 1/045; H01P 1/161; H01Q 13/0258; H01Q 21/26; H01Q 21/061; H01Q 21/24; F41G 7/346; F41G 7/305; F41G 7/28
  See application file for complete search history.

(56) References Cited

U.S. PATENT DOCUMENTS 2,362,561 A * 11/1944 Katzin ............... H01Q 13/0258
                                                    343/756
2,364,371 A * 12/1944 Katzin ............... H01Q 13/0258
                                                    343/756
(Continued)

FOREIGN PATENT DOCUMENTS

EP        0552944 A1 *  7/1993  ............ H01P 1/161
EP        0945911 A1 *  9/1999  ............ H01P 1/161
(Continued)

*Primary Examiner* — Bernarr E Gregory

(57) ABSTRACT

A cavity sensor including: a body defining a cavity, the cavity having an opening on one end and a closed surface on other end; a reflective surface disposed in the cavity, the reflective surface being angled 45 degrees relative to a propagation direction of an incoming wave through the opening; and first and second angle probes positioned on each of two ends of the reflective surface. Also provided is a cavity sensor including: a body defining a cavity, the body having two or more conduits, each having an opening, the body having a closed surface opposing the openings, and a probe positioned in the cavity at a position common to each of the two or more conduits.

8 Claims, 16 Drawing Sheets

(51) Int. Cl.
*G01C 19/48* (2006.01)
*G01C 19/00* (2013.01)

(56) References Cited

U.S. PATENT DOCUMENTS

| | | | | |
|---|---|---|---|---|
| 4,797,681 A * | 1/1989 | Kaplan | ............... | H01Q 13/0258 333/137 |
| 5,208,602 A * | 5/1993 | Monser et al. | ......... | H01O 21/26 343/795 |
| 5,796,371 A * | 8/1998 | Sato | .................. | H01P 1/161 333/21 A |
| 5,977,844 A * | 11/1999 | Baird | ................ | H01P 1/161 333/135 |
| 6,043,789 A * | 3/2000 | Suzuki | .................... | H01P 1/161 333/21 A |
| 6,572,052 B1 * | 6/2003 | Hansen | ................... | F41G 7/305 244/3.11 |
| 6,724,341 B1 * | 4/2004 | Pereira et al. | ........... | G01S 7/024 342/62 |
| 7,821,462 B1 * | 10/2010 | Reigle et al. | .......... | H01O 21/24 343/700 MS |
| 8,076,621 B2 * | 12/2011 | Rastegar | ................. | F41G 7/305 244/3.1 |
| 8,093,539 B2 * | 1/2012 | Rastegar | ................... | F41G 7/28 244/3.1 |
| 8,258,999 B2 * | 9/2012 | Rastegar | ................. | F41G 7/305 244/3.1 |
| 8,587,473 B2 * | 11/2013 | Rastegar | ................. | F41G 7/305 244/3.1 |
| 8,637,798 B2 * | 1/2014 | Rastegar | ................. | F41G 7/346 244/3.1 |
| 10,038,237 B2 * | 7/2018 | Eastburg et al. | .... | H01Q 21/061 |

FOREIGN PATENT DOCUMENTS

| | | | | |
|---|---|---|---|---|
| EP | | 1465282 A1 * | 10/2004 | ............. H01P 1/161 |
| JP | | 9-307305 A * | 11/1997 | ............... H01P 1/161 |

* cited by examiner

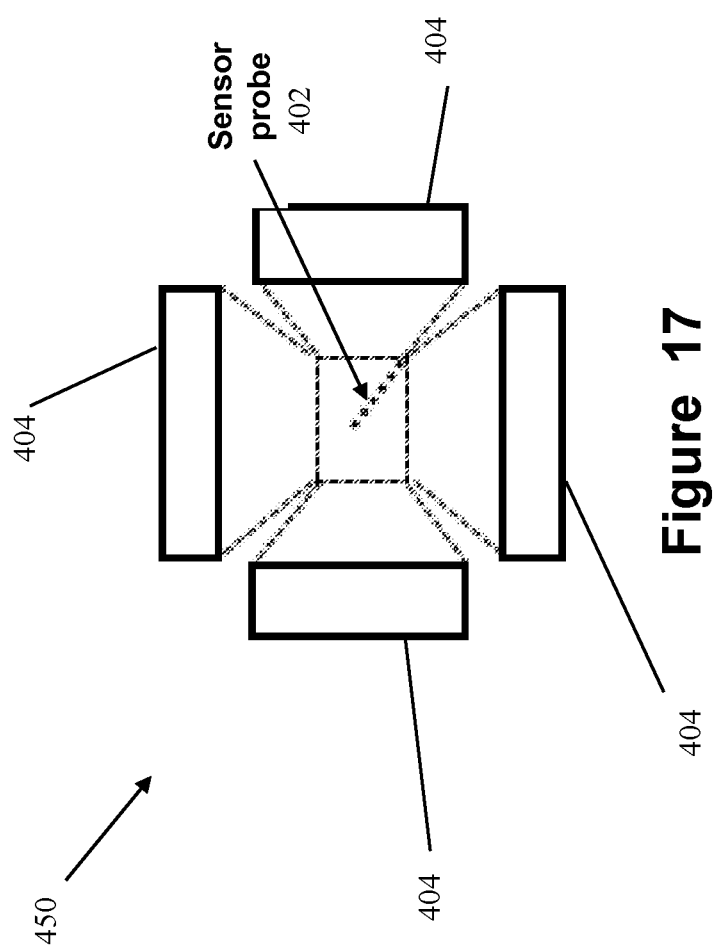

POLARIZED RADIO FREQUENCY (RF) ROLL, PITCH AND YAW ANGLE SENSORS AND ORIENTATION MISALIGNMENT SENSORS

CROSS-REFERENCE TO RELATED APPLICATION

This application claims benefit to earlier filed U.S. Provisional Patent Application No. 62/510,232, filed on May 23, 2017, the entire contents thereof is incorporated herein by reference.

GOVERNMENT RIGHTS

This invention was made with Government support under contracts W15QKN-12-C-0036 and W15QKN-17-C-0004 awarded by the United States Army. The Government has certain rights in the invention.

BACKGROUND

1. Field

The present disclosure relates generally to angular orientation sensors and, more particularly, to systems and methods for the design of cavity sensors for measuring roll, pitch and yaw angles using polarized Radio Frequency (RF) signals from scanning polarized RF reference sources and methods and systems for configuring the cavity sensors to function as "homing" sensors for guiding an object remotely to a desired location.

2. Prior Art

For guidance and/or steering purposes, all manned and unmanned mobile platforms, such as land vehicles, powered or non-powered airborne platforms, surface or submerged marine platforms, or various space vehicles, require onboard information as to their absolute (relative to earth) position and orientation (sometimes called attitude) or their position and orientation relative to another object such as a reference platform or a target object.

This position and orientation information is particularly important for unmanned and guided platforms such as mobile robots, Unmanned Aerial Vehicles (UAV), unmanned guided surface or submerged platforms, and the like. This is also the case in future smart and guided projectiles, including gun-fired munitions, mortars and missiles. Such platforms will also require the aforementioned absolute and/or relative position and orientation information onboard the platform for closing the feedback guidance and control loop to guide the platform to the desired target or track a specified trajectory or the like.

In certain cases, the onboard position and orientation information (absolute or relative to the target, a reference station, another mobile platform, etc.) can be provided by an outside source, for example, by GPS for position or by a radar reading or optical signal that is reflected off some target or received by the mobile platform. In other cases, it is either required or is highly desirable to have autonomous sensors on board the mobile platform, including gun-fired projectiles, mortars and missiles, to directly measure the position and orientation of the object with respect to a fixed object (for example a ground station) or a moving object (for example a moving target).

It is noted that even though in this disclosure all references are made to moving platforms, it IS appreciated by those of ordinary skill in the art that the provided description also includes the measurement of the position and orientation of one object relative to another object, one or both of which may be fixed to a third object such as the ground.

Currently available sensors for remote measurement of the angular position (attitude) of an object relative to the earth or another object (target or weapon platform) can be divided into the following five major classes.

The first class of sensors measure changes in the angular position using inertial devices such as accelerometers and gyros. Inertial based angular orientation sensors, however, generally suffer from drift and noise error accumulation problems. In such sensors, the drift and the measurement errors are accumulated over time since the acceleration must be integrated twice to determine the angular position. Thus, the error in the angular position measurement increases over time. In addition, the initial angular orientation and angular velocity of the object must be known accurately. Another shortcoming of inertia based angular position sensors is that the angular position of one object relative to another cannot be measured directly, i.e., the orientation of each object relative to the inertia frame must be measured separately and used to determine their relative angular orientation. As a result, errors in both measurements are included in the relative angular orientation measurement, thereby increasing it even further. In addition, electrical energy must be spent during the entire time to continuously make acceleration measurement.

In the case of gun-fired munitions, two other major problems are encountered with inertia-based sensors. Firstly, they must be made to withstand firing accelerations that in certain cases could be in excess of 100,000 Gs. However, to achieve the required guidance and control accuracy over relatively long distances and related times, the absolute angular orientation of the projectile must be known during the entire time of the flight within very small angles corresponding to sub-fractions of one G. Accelerometer also suffer from settling time problem after being subjected to the initial high G shock loading, which further reduces their overall sensory precision. As a result, the development of high precision inertia based accelerometers and gyros that could withstand the aforementioned high G levels and require near zero settling time is an extremely difficult task.

The second class of angular orientation sensors operates using optical methods. Such sensory systems can directly measure angular position of one object relative to another. However, optical based angular position sensory systems suffer from several disadvantages, including operation only in the line of sight between two objects; accurate measurement of relative angular orientation only if the objects are relatively close to each other; limited range of angular orientation measurement; relatively high power requirement for operation; requirement of relatively clean environment to operate; and in military applications the possibility of exposing the site to the enemy. Optical gyros do not have most of the above shortcomings but are relatively large, require a considerable amount of power, and are difficult to harden for high G firing accelerations. Optical methods such as tracking of projectiles with surface mounted reflectors and the like have also been developed, which are extremely cumbersome to use even during verification testing, suffer from most aforementioned shortcomings, and are impractical for fielded munitions. In addition, the information about the object orientation can usually be determined only at the ground station and must be transmitted back to the moving object for guidance and control purposes. Thus, optical angular position sensors are generally not suitable for munitions and majority of other applications.

The third class of angular orientation sensors is magnetometers that can be used to measure orientation relative to the magnetic field of the earth. The main problem with magnetometers is that they cannot measure orientation of the object about the magnetic field of the earth. Other important issues are low sensitivity; requirement of an accurate map of the magnetic field of the area of operation; and sensitivity to the presence of vehicles and the like in the area, the configuration of which usually varies in time, particularly in an active war theatre.

The fourth class of angular orientation measurement systems are based on the use of radio frequency (RF) antennas printed or placed on the surface of an object to reflect RF energy emanating from a ground-based radar system. The reflected energy is then used to track the object on the way to its destination. With two moving objects, the radar measures the time difference between the return signals from each of the objects and thereby determines angular information in terms of the angle that the relative velocity vector makes with respect to a coordinate system fixed to one of the objects. With such systems, measurement of full spatial orientation of an object (relative to the fixed radar or a second object) is very difficult. In addition, the information about the object orientation is determined at the radar station and must be transmitted back to the moving object(s) if it is to be used for course correction. It is also very difficult and costly to develop systems that could track multiple projectiles. It is noted that numerous variations of the above method and devices have been devised with all suffering from similar shortcomings.

In addition to the above angular orientation measurement sensors, GPS signals have also been used to provide angular orientation information. Such systems, however, have several significant shortcomings, particularly for munitions applications. GPS also provides mainly only the direction of travel in the plane of horizon. These include the fact that GPS signals may not be available along the full path of the flight; such orientation sensory systems are generally not very accurate; and the measurements cannot be made fast enough to make them suitable for guidance and control purposes in gun fired munitions and mortars. In addition, GPS signals are generally weak and prone to jamming.

The fifth class of angular orientation sensors is based on utilizing polarized Radio Frequency (RF) reference sources and mechanical cavities as described in U.S. Pat. Nos. 6,724,341 and 7,193,556, each of which are incorporated herein by reference, and hereinafter are referred to as "polarized RF angular orientation sensors". These angular orientation sensors use highly directional mechanical cavities that are very sensitive to the orientation of the sensor relative to the reference source due to the cross-polarization and due to the geometry of the cavity. The reference source may be fixed on the ground or may be another mobile platform (object). Being based on RF carrier signals, the sensors provide a longer range of operation. The sensors can also work in and out of line of sight. In addition, the sensors make angular orientation measurements directly and would therefore not accumulate measurement error. The sensor cavities receive the electromagnetic energy emitted by one or more polarized RF sources. The angular position of the cavity sensor relative to the reference source is indicated by the energy level that it receives. A system equipped with multiple such waveguides can then be used to form a full spatial orientation sensor. In addition, by providing more than one reference source, full spatial position of the munitions can also be measured onboard the munitions.

The polarized RF based angular orientation sensors provide highly precise angular orientation measurements. The sensors, when embedded in a mobile platform such as in a projectile, can measure full angular orientation of the projectile (mobile platform) relative to the fixed ground station or another moving object such as a UAV or another projectile (mobile platform) where the reference source is located. These angular orientation sensors are autonomous, i.e., they do not acquire sensory information through communication with a ground, airborne or the like source. The sensors are relatively small and can be readily embedded into the structure of most mobile platforms including munitions without affecting their structural integrity. Thus, such sensors are inherently shock, vibration and high G acceleration hardened. A considerable volume is thereby saved for use for other gear and added payload. In addition, the sensors become capable of withstanding environmental conditions such as moisture, water, heat and the like, even the harsh environment experienced by munitions during firing. In addition, the sensors require a minimal amount of onboard power to operate since they do not have to be continuously operating and may be used only when the sensory information is needed.

The above class of RF based full angular orientation sensors are dependent on the magnitude of the received signal at the cavity sensors from the reference source to determine the orientation of the sensor relative to the reference source. This is the case, for example, for the angular orientation sensors which are based on utilizing polarized cavity sensors described in U.S. Pat. Nos. 6,724,341 and 7,193,556.

Briefly, referring now to FIGS. 1 and 2, there is shown a representation of a cavity sensor 100 and its operation with respect to a polarized radio frequency (RF) reference (illuminating) source 101. An electromagnetic wave consists of orthogonal electric (E) and magnetic (H) fields. The electric field E and the magnetic field H of the illuminating beam are mutually orthogonal to the direction of propagation of the illumination beam. When polarized, the planes of E and H fields are fixed and stay unchanged in the direction of propagation. Thus, the illuminating source establishes a (reference) coordinate system with known and fixed orientation. The cavity sensor 100 reacts in a predictable manner to a polarized illumination beam. When three or more cavity sensors are distributed over the body of an object, and when the object is positioned at a known distance from the illuminating source, the amplitudes of the signals received by the cavity sensor 100 can be used to determine the orientation of the object relative to the reference (illuminating) source 101, i.e., in the aforementioned reference coordinate system of the reference source 101. The requirement for the proper distribution of the cavity sensors 100 over the body of the object is that at least three of the cavity sensors be neither parallel nor co-planar.

It is therefore observed that the aforementioned classes of RF based full angular orientation sensors are dependent on the magnitude of the received signal at the cavity sensors from the reference source to determine the orientation of the sensor relative to the reference source. The use of the signal magnitude, however, has several major shortcomings that limits the utility of such sensors as well as degrades their angular orientation measurement precision. The following are the major shortcomings of the use of signal magnitude information in these cavity sensors for measuring angular orientation relative to the polarized RF reference sources:

1. To relate the magnitude of the received signal to angular orientation, the distance from the reference source to the angular orientation sensors must be known. This in general means that other means must be also provided to measure or indicate the position of the orientation sensors relative to the reference source.
2. In practice, the signal received at the angular orientation sensor would be noisy, it may face losses due to the environmental conditions, and is also prone to measurement errors at the sensor.
3. The magnitude of the signal received at the angular orientation sensors and its relationship to the angular orientation of the sensors (object to which the sensors are attached) could be significantly different when the object is not in the line-of-sight of the reference source. Therefore, when the object is not in the line-of-sight, the received signal magnitude information cannot yield an accurate angular orientation measurements.

SUMMARY

The use of polarized RF reference sources with scanning capability would eliminate the above shortcomings of polarized RF cavity angular orientation sensors. This would be the case since scanning provides the means of transmitting scanning patterns that are detected by the cavity sensors, from which the sensor angular orientation information can be extracted due to the sensitivity of the received signal to the orientation of the cavity sensor relative to the scanning reference source. In addition, since the cavity sensor is used to detect the pattern of the received signal and not its magnitude and since the signal pattern does not change with distance (only the magnitude of the pattern is reduced by distance), therefore the angular orientation measurement becomes independent of the distance between the reference source and the cavity sensor. Another advantage of using polarized RF scanning reference sources is that in non-line-of-sight conditions, since obstacles do not affect the direction of the plane of polarization and only reduce the signal strength, therefore the signal pattern and the angular orientation information is not affected. Another advantage of using polarized RF scanning reference sources is that since noise and effects of reflections and multi-paths for low wavelength (high frequency) RF transmitted signals is random, their net effect can readily eliminated by proper signal pattern detecting processing.

The method of constructing a polarized RF scanning reference source and its operation are described in detail in U.S. Pat. Nos. 8,164,745; 8,259,292; 8,446,577 and 8,514,383, each of which are incorporated herein by reference. In short, referring to FIG. 3, by modulating the amplitudes of the synchronized and polarized fields $E_x$ and $E_y$, the referencing source transmits a scanning polarized vector field $\bar{E}(t)$. By properly modulating the two field amplitudes, the desired vector field scanning pattern is obtained. It is noted that $E_x$ and $E_y$ do not have to be orthogonal.

In general, any desired scanning pattern may be implemented with the present polarized RF scanning reference source. For example, one may choose scanning patterns with peaks that are sharper than a simple harmonic sine wave, thereby increasing the accuracy of a peak detection algorithm. Alternatively, one may add specially designed patterns that will simplify a pattern detection algorithm being used and/or to reject noise, and/or to reduce their susceptibility to detection and jamming, or for other application specific purposes.

It is noted that the following method may also be used to provide two or even more simultaneous and arbitrarily oriented scanning reference sources. Such multi-range scanning is useful for the establishment of a network of reference sources and/or to limit the range or radiation when multiple sensors (for example, munitions and/or weapon platforms) are using the reference source.

In general, the signal received by cavity sensors from a polarized RF reference source will be sensitive to changes in orientation about any axis (for example the axes indicated by $\theta_x$, $\theta_y$ and $\theta_z$ in FIG. 2). The cavity sensors may, however, be designed with geometries that when positioned in certain direction relative to the referencing source they would be more sensitive to change in one orientation and less sensitive to others. For example the cavity sensor 100 shown in the schematic of FIG. 2 may be designed to be highly sensitive to roll (rotation about the axis $Y_{ref}$—or the so-called roll), and less sensitive to rotations about the axes $X_{ref}$ and $Z_{ref}$, i.e., have high sensitivity to roll and low cross-sensitivity to pitch and yaw.

A need, however, exists for methods to design cavity sensors that are constructed to measure roll angle (i.e., rotation of the cavity sensor 100 about the $Y_{ref}$ of the reference source 101), or yaw angle (i.e., rotation of the cavity sensor 100 about the $Z_{ref}$ of the reference source 101, which is the direction of the transmitted electromagnetic wave), or pitch angle (i.e., rotation of the cavity sensor 100 about the $X_{ref}$ of the reference source 101).

A need also exists for methods to design cavity sensors that are constructed to measure roll, yaw and pitch angles in the reference coordinate system of a polarized RF scanning reference source with the polarized vector field $\bar{E}(t)$ scanning as shown in FIG. 3, with the wave traveling in the direction perpendicular to the $E_x$ and $E_y$ plane from the reference source.

A need also exists for methods to synthesize efficient polarized RF reference source scanning patterns that can provide the information required for angle measurement calculations at the cavity sensor and for the method of calculating the angle at the sensor cavity, i.e., processing the received signal at the sensor cavity to extract angle measurement.

An objective is to provide methods to design cavity sensors for roll, yaw and pitch angles measurement in the reference coordinate system of a polarized RF scanning reference source with the polarized vector field $\bar{E}(t)$ scanning as shown in FIG. 3, with the wave traveling in the direction perpendicular to the $E_x$ and $E_y$ plane from the reference source.

Another objective is to provide methods to synthesize efficient polarized RF reference source scanning patterns that can provide the information required for angle measurement calculations at the cavity sensor and methods of calculating the angle at the sensor cavity, i.e., processing the received signal at the sensor cavity to extract angle measurement.

In addition, several methods and related systems have been developed for providing the sensory information for remotely guiding an object to a desired stationary or moving object or location. Such methods and related systems include those that use lasers that are pointed in the desired direction or at a desired stationary or moving target object or location. Such methods and related system have a number of shortcoming, including limited range; that they work only in line-of-sight; and that they do not provide sensory information related to orientation about the direction of travel, such as roll angle of a remotely guided flying object, for example, an Unmanned Aerial Vehicle (UAV) or a rocket. Other methods include the use of radar and visual observation, both of which method have the shortcoming of requiring communication with the flying object from a base (control) station to transmit the position information or command corrective action. For this reason, neither method can provide the guidance sensory information more one or at most a few flying objects. Visual observation does generally work during night or bad weather and non-line-of-sight and has very short range. Radar does not provide object orientation information and is not suitable for relatively small and non-metallic objects. Other methods also include the use of GPS, which may not be available at the location and/or may not be accurate enough for a given application and/or may have been jammed or spoofed. The GPS signal also does not provide object angular orientation information. Other methods also include inertial navigation sensors which are prone to drift over time and in which the target information must be provided at the start of the flight and can be varied only through a communication link. Other shortcomings of inertial sensors were previously indicated.

It is appreciated by those skilled in the art that a methods and systems to function as "homing" sensors for guiding flying objects remotely to a desired location or to intercept a moving target, where the desired location or to moving target to be intercepted is designated from a fixed or mobile station can also be used for guiding mobile objects, such as Unmanned Ground Vehicles (UGV) or the like on the ground or unmanned moving objects on water or serve as a "homing" sensor to direct the driver of a manned ground vehicles or the like towards the said desired location or to intercept a moving target.

Hereinafter, the methods and sensory devices and systems will be described for a flying object with no intention of excluding their application to fixed or mobile objects on the ground such as UGVs and other mobile platforms or even people or animals.

A need therefore also exists for methods and systems to function as "homing" sensors for guiding flying objects remotely to a desired location or to intercept a moving target, where the desired location or to moving target to be intercepted is designated from a fixed or mobile station.

A need also exists for methods and systems to function as "homing" sensors for guiding flying objects remotely to a desired location or to intercept a moving target, where the methods and systems can provide angular orientation information, preferably full angular orientation information, onboard the flying object.

In many applications, there is also a need that the said methods and systems to function as "homing" sensors for guiding flying objects remotely to a desired location or to intercept a moving target be relatively low power and occupy relatively small volumes. This is particularly desirable in munitions, UAVs and the like applications.

Another objective is to provide methods and systems that would function as "homing" sensors for guiding flying objects remotely to a desired location or to intercept a moving target, where the desired location or to moving target to be intercepted is designated from a fixed or mobile station.

Another objective is to provide methods and systems that would function as "homing" sensors for guiding flying objects remotely to a desired location or to intercept a moving target, where the methods and systems can provide angular orientation information, preferably full angular orientation information, onboard the flying object.

BRIEF DESCRIPTION OF THE DRAWINGS

These and other features, aspects, and advantages of the apparatus of the present invention will become better understood with regard to the following description, appended claims, and accompanying drawings where:

FIG. 17 illustrates an example of the design of a two pair integrated differential full angular orientation misalignment measuring cavity sensor.

DETAILED DESCRIPTION OF THE PREFERRED EMBODIMENT

Figure 1:
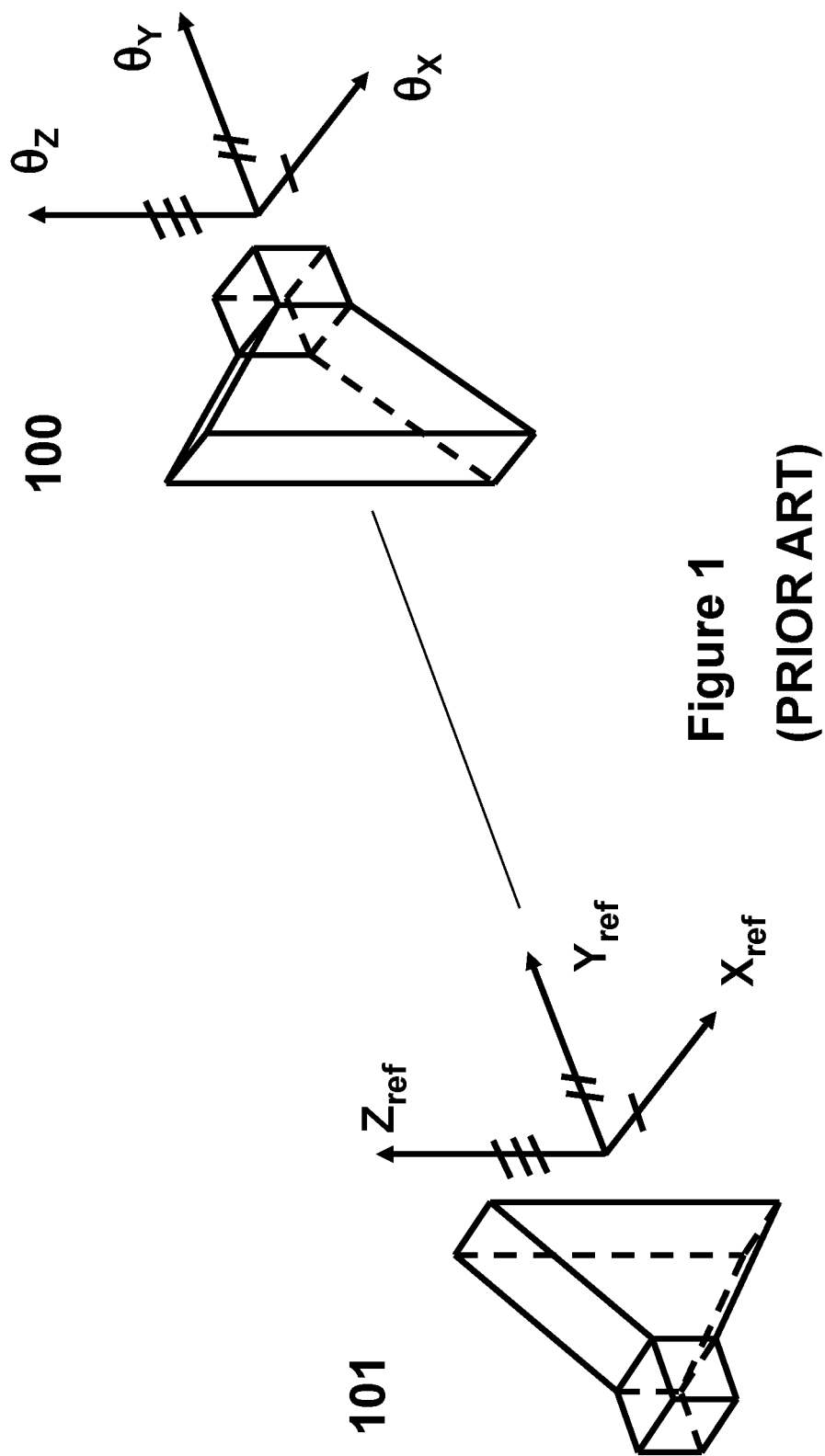
FIGS. 1 and 2 illustrate a schematic representation of a cavity sensor with respect to a polarized radio frequency (RF) reference source of the prior art.
Figure 2:
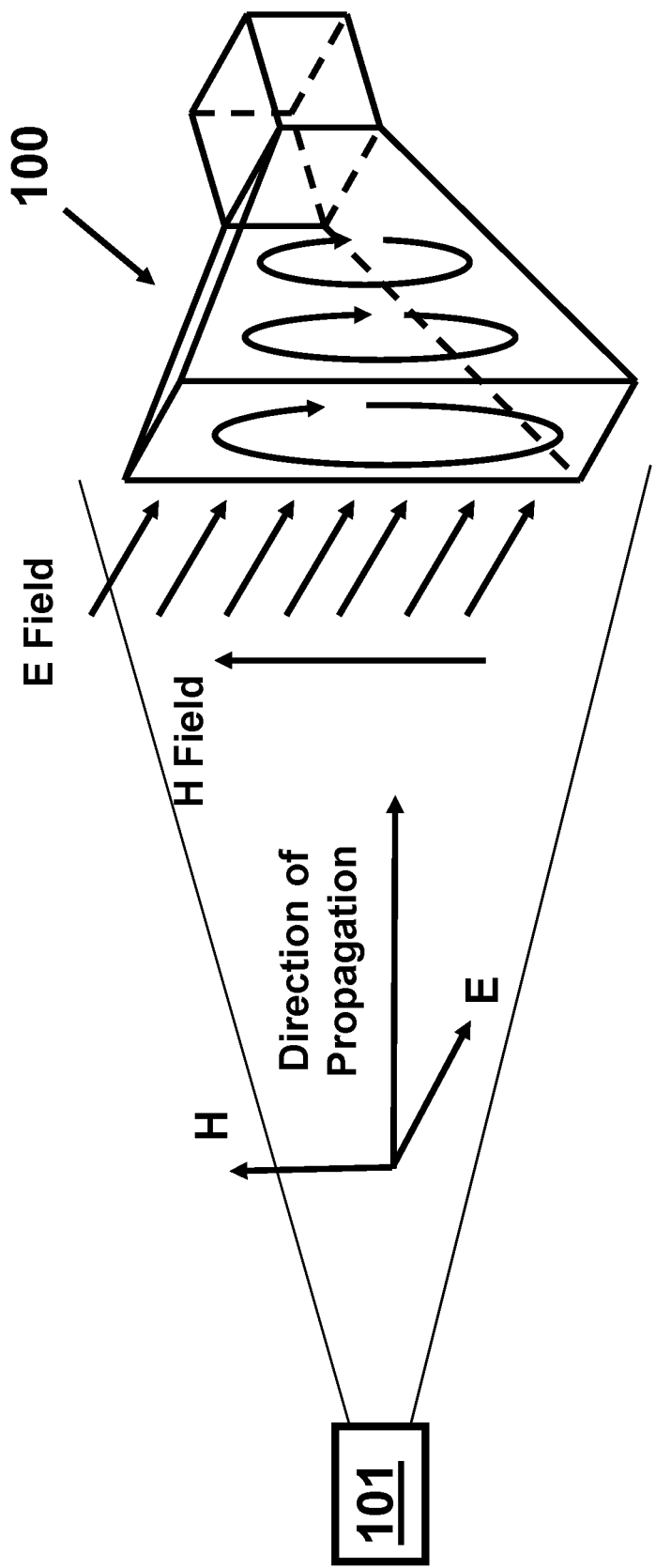
Figure 3:
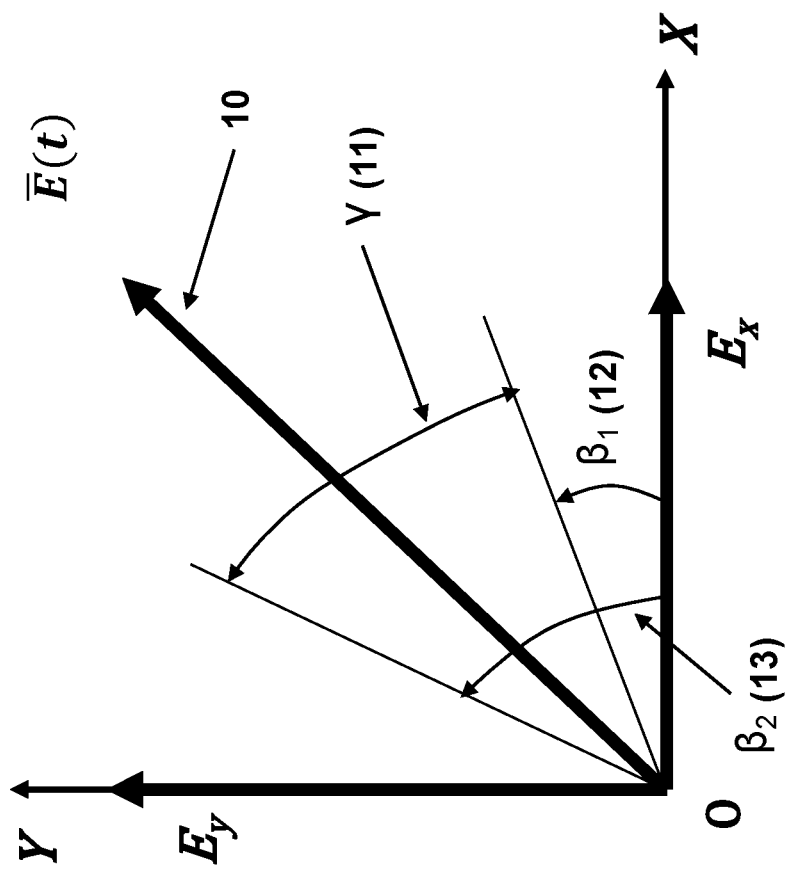
FIG. 3 illustrates a scanning polarized vector field $\overline{E}(t)$ of a polarized RF scanning reference source that is generated by two synchronized and orthogonally directed modulating polarized RF transmitters that are positioned at the origin of the Cartesian XY coordinate system O.
Figure 4:
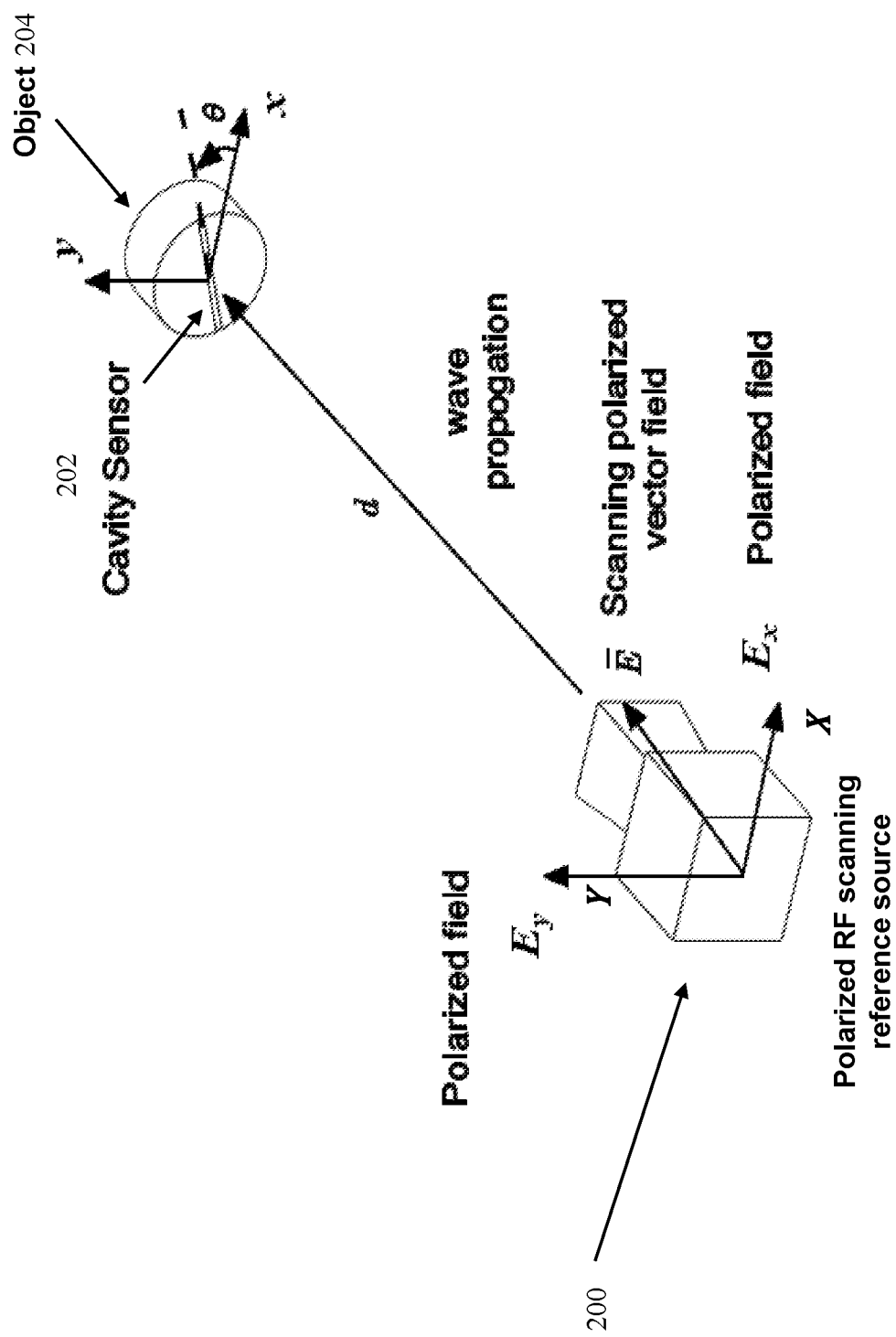
FIG. 4 illustrates the configuration of a polarized RF scanning reference source and a cavity sensor for measuring roll angle.

The roll, pitch and yaw angle sensory systems is best described as being configured for measuring the roll angle of an object to which the sensor cavity is provided, as shown in FIG. 4. FIG. 4 shows a polarized RF scanning reference source 200 to which the XYZ Cartesian coordinate system is fixed. In the coordinate system XYZ, the Z axis is along the direction of the propagating electromagnetic wave d (in the −Z direction using the right hand rule). A cavity sensor 202 is fixed to an object 204 and is positioned a distance d in far field of the polarized RF scanning reference source, attached to the object. The roll angle θ of the cavity sensor 202 (i.e., of the object 204) is measured from the sensor cavity orientation shown in FIG. 4, such that at the roll angle θ=0 and with polarized fields $E_x$ being transmitted while the polarized field $E_y$ is off, the cavity sensor output is maximum. This roll angle referencing configuration is arbitrary and may be varied but is selected since it simplifies the roll angle measurement calculations described below. In addition, for a symmetrically designed sensor cavity 202 like the horn shaped cavity sensor 100 of FIG. 1, the roll angle θ=0 configuration corresponds to the orientation in which cross-polarization angle of the transmitted polarized field $E_x$ with the receiving cavity sensor terminal is also zero.

Figure 5:
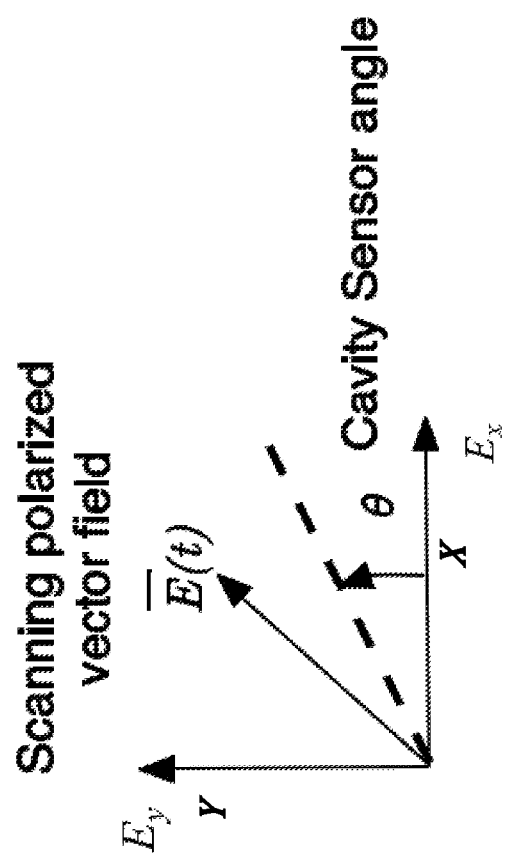
FIG. 5 illustrates the scanning polarized vector field $\overline{E}(t)$ obtained by modulating the amplitudes of the synchronized and polarized fields $E_x$ and $E_y$ and the indicated roll angle as shown in the configuration of FIG. 4.

Referring to FIG. 5, by modulating the amplitudes of the synchronized and polarized fields $E_x$ and $E_y$, the referencing source transmits a scanning polarized vector field $\overline{E}(t)$. By properly modulating the two field amplitudes, the desired vector field scanning pattern is obtained. It is noted that $E_x$ and $E_y$ do not have to be orthogonal. In the present configuration of FIG. 4, the (roll) angle to be measured by the sensor is the angle θ as shown in FIGS. 4 and 5.

FIG. 5 shows the scanning polarized vector field $\overline{E}(t)$ obtained by modulation of the amplitudes of the synchronized and polarized fields $E_x$ and $E_y$ (traveling in the XZ and YZ planes, respectively) of the polarized RF scanning reference source and the aforementioned roll angle θ. As was previously described, by properly modulating the amplitudes of the two fields $E_x$ and $E_y$, the desired vector field scanning pattern is obtained. It is noted that $E_x$ and $E_y$ do not have to be orthogonal.

The field strength detected by the cavity sensor 202 at an angle θ is given by the scalar function R(t) as $$R(t) = g(d) f(\overline{E}(t), \theta) \qquad (1)$$

where g(d) is the gain related to the distance d between the scanning reference source and the cavity sensor and the existing environmental factors. Since the time taken to make an angle measurement is very small, changes in the gain g(d) during each angle measurement are negligible and the gain g(d) can be considered to stay constant.

The mapping function $f(\overline{E}, \theta)$ is determined by the design of the cavity sensor and its calibration. The geometry of the cavity is designed and the pick-up terminal are located to maximize sensitivity to roll angle and minimize sensitivity to pitch and yaw. Since the angle θ is measured by matching the scanning pattern, the effect of the fixed gain g(d) is eliminated during each angle measurement as described in the following example pattern.

For a properly formulated scanning pattern for the polarized RF reference source, the roll angle θ is readily extracted from the received signal at the cavity sensor from the measured amplitude pattern of the vector R(t), the known mapping function $f(\overline{E}, \theta)$, and the scanning pattern of the vector $\overline{E}(t)$ as shown in the following example.

As an example, consider a scanning vector field $\overline{E}(t) = E_x(t)\hat{i} + E_y(t)\hat{j}$ formed by the orthogonal synchronized polarized electric field signals $E_x(t)$ and $E_y(t)$ shown in FIGS. 4 and 5, and which are modulated as follows $$E_x(t) = a(\cos \omega t + \cos 2\omega t) + b \qquad (2)$$

$$E_y(t) = a(\sin \omega t + \sin 3\omega t) + b \qquad (3)$$

where ω is the fundamental frequency of both signals, a is a constant signal amplitude and b is the constant that provides a proper amplitude modulation index.

The electric field detected by the cavity sensor 202 will then become $$\begin{aligned} R(t) &= g(d)(E_x(t)\cos\theta + E_y(t)\sin\theta) \qquad (4) \\ &= g(d)\{[a(\cos\omega t + \cos 2\omega t) + b]\cos\theta + \\ &\quad [a(\sin\omega t + \sin 3\omega t) + b]\sin\theta\} \\ &= g(d)[a(\cos\omega t\cos\theta + \sin\omega t\sin\theta) + a\cos\theta\cos 2\omega t + \\ &\quad a\sin\theta\sin 3\omega t + b(\sin\theta + \cos\theta)] \\ &= g(d)[a\cos(\omega t - \theta) + a\cos\theta\cos 2\omega t + a\sin\theta\sin 3\omega t + \\ &\quad b(\sin\theta + \cos\theta)] \end{aligned}$$

It is readily seen from (4) that the roll angle θ can be determined from the phase shifting of the fundamental frequency ω and the zero crossing of the fundamental frequency occurs when the harmonics 2ω and 3ω are in phase. As expected, the gain g(d) does not affect the angle measurement, therefore angle measurement has become independent of position (distance) measurement.

The polarized RF scanning pattern of equations (2) and (3) is shown to have the unique characteristic of yielding the roll angle and time reference through readily detectable fundamental frequency and its first two harmonics. The detection electronics is also made simple and low cost and since the pattern is known to the detection signal processing unit, the roll angle can be recovered even when the signal-to-noise ratio of the measured RF signal is very low and even below unity. In fact, a signal pattern may even be hidden in the environmental noise, making the system immune to all countermeasures. The polarized nature of the scanning pattern along with being transmitted in short and random pulses, makes it almost impossible to jam or spoof.

In addition, high angular precision is possible due to the complex modulation patterns, and mapping of the angular space to the time domain. With off-the-shelf components, time measurement accuracy has been shown to be better than 0.1%. Thus, angle accuracy, which is proportional to time, can become better than 0.06° for a scan range of +/−30°.

It will be appreciated by those skilled in the art that other information is also available in the transmitted signal pattern and the received signal that can be used to increase the precision and robustness of the angle measurement. For example, the amplitude of the fundamental frequency can provide distance information.

In addition, the ratio of the amplitudes of the second and first harmonics, i.e., the ratio of the amplitudes of the harmonics with frequencies 3ω and 2ω, respectively, is seen to be tan(θ), which provides a second measurement for the roll angle. As a result, the angle measurement can be made more accurately and the sensory system becomes more robust. In addition, by using more harmonics of the fundamental frequency, the angle measurement can be made from multiple phase shifts and multiple ratios of the amplitudes of the higher harmonics of the fundamental frequency, thereby significantly increasing the angle measurement accuracy and the robustness of the sensory system.

One very important feature of the patterns of the type presented in this example is that they provide a reference position angle, which is fixed in the referencing coordinate system of the scanning referencing source. In this case, the time zero of the scanning pattern occurs when the two harmonics 2ω and 3ω are in phase, from which the phase shift in the fundamental frequency ω, i.e., the roll angle θ is determined.

Figure 6:
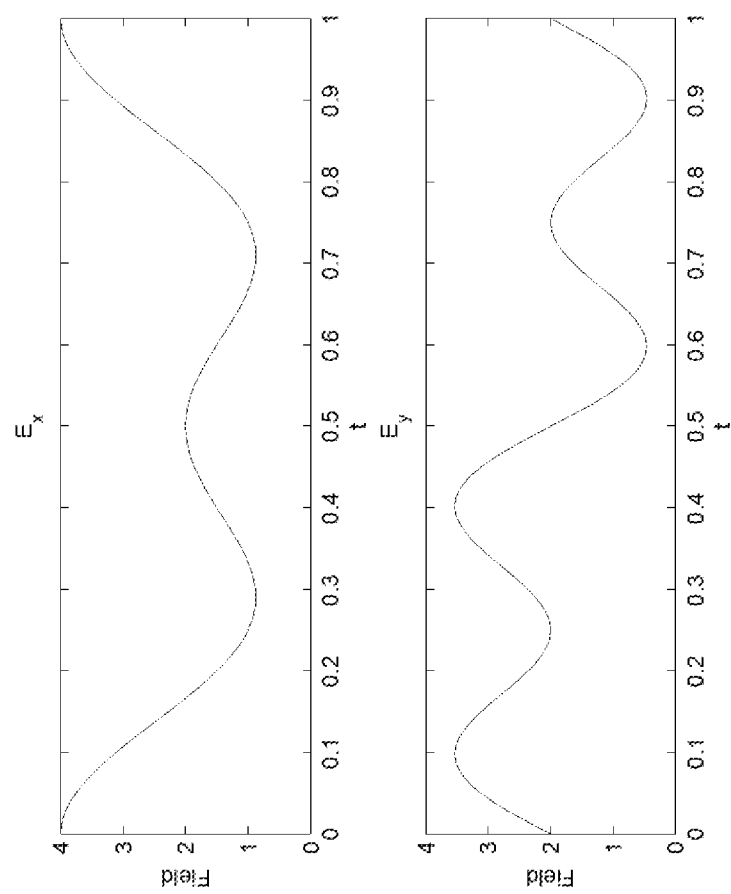
FIG. 6 is the plot of an example of the transmitted polarized fields $E_x$ and $E_y$ for the pattern for roll angle measurement.

As an example, in the orthogonal synchronized polarized electric field signals $E_x(t)$ and $E_y(t)$ of equations (2) and (3), let a=1 and b=2. The resulting polarized electric field patterns $E_x(t)$ and $E_x(t)$ are shown in FIG. 6 for a period of the fundamental frequency T.

Figure 7:
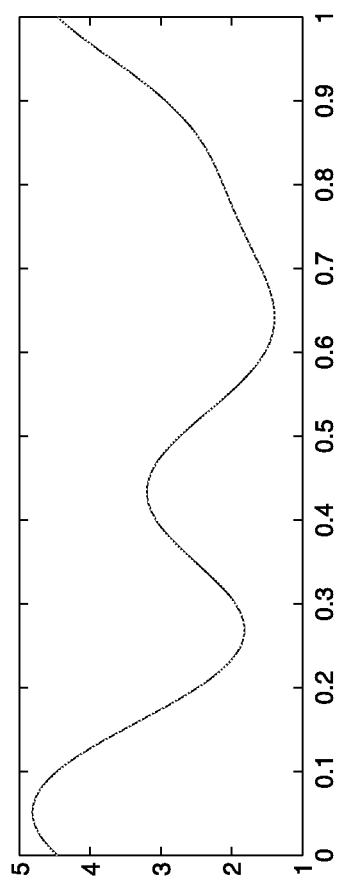
FIG. 7 is the plot of the detected signal pattern (top) for the transmitted polarized fields $E_x$ and $E_y$ of FIG. 6 and its $\omega$, $2\omega$ and $3\omega$ harmonic amplitudes (bottom).

The roll angle θ can then be measured from the detected signal and its fundamental frequency and first two harmonics. As an example, the amplitude pattern of the detected signal (i.e., the magnitude of the vector R(t), equation (4)) and its fundamental frequency ω and its first two harmonics 2ω and 3ω at the roll angle θ=30° are shown in FIG. 7, in which the fundamental frequency can be seen to have shifted π/12 of the period T, corresponding to the roll angle θ=30°. The time zero is when the harmonics 2ω and 3ω are in phase, i.e., at time T/4.

The cavity sensors 202 are geometrical cavities with one or more pick up terminals that are designed to provide output that varies with orientation of the sensor with respect to the direction of the incoming polarized RF plane of polarization. The cavities are designed for high sensitivity to the desired orientation variation and for relatively low cross-sensitivity. In general, the geometry of the cavities is designed through an iterative process of trial and errors using Finite Element (FE) modeling and Finite Element Analysis (FEA) software for modeling sensor structures and determining their interaction with the incoming RF waves.

For a cavity sensor 202 that is designed with certain sensitivity to the angle θ but has linear characteristic to the amplitude of $\overline{E}$, the mapping function $f(\overline{E}, θ)$ can be expressed as $$f(\overline{E},θ)=|\overline{E}|f'(θ-\angle\overline{E}) \quad (5)$$

Then the electric field detected by this cavity becomes $$R(t) = g(d)\left[E_x(t)f'(θ) + E_y(t)f'\left(θ - \frac{\pi}{2}\right)\right] \quad (6)$$

$$= g(d)\{[a(\cos\omega t + \cos2\omega t) + b]f'(θ) +$$

$$[a(\sin\omega t + \sin3\omega t) + b]f'\left(θ - \frac{\pi}{2}\right)\}$$

$$= g(d)\left[a\left(\cos\omega t f'\left(θ - \frac{\pi}{2}\right) + \sin\omega t f'(θ)\right) +\right.$$

$$af'\left(θ - \frac{\pi}{2}\right)\cos2\omega t + af'(θ)\sin3\omega t + b(f'(θ) +$$

$$\left.f'\left(θ - \frac{\pi}{2}\right))\right]$$

$$= g(d)\left[a\sqrt{f'\left(θ - \frac{\pi}{2}\right)^2 + f'(θ)^2}\cos(\omega t - \phi) +\right.$$

$$af'\left(θ - \frac{\pi}{2}\right)\cos2\omega t + af'(θ)\sin3\omega t + b(f'(θ) +$$

$$\left.f'\left(θ - \frac{\pi}{2}\right))\right]$$

where $$\phi = \tan^{-1}\frac{f'(θ)}{f'\left(θ - \frac{\pi}{2}\right)}.$$

The angle θ can then be determined from the phase shift φ. Similar amplitude relationships define the amplitudes of the frequencies 2ω and 3ω, and the time zero of the scanning pattern still occurs when the two harmonics 2ω and 3ω are in phase.

Figure 8:
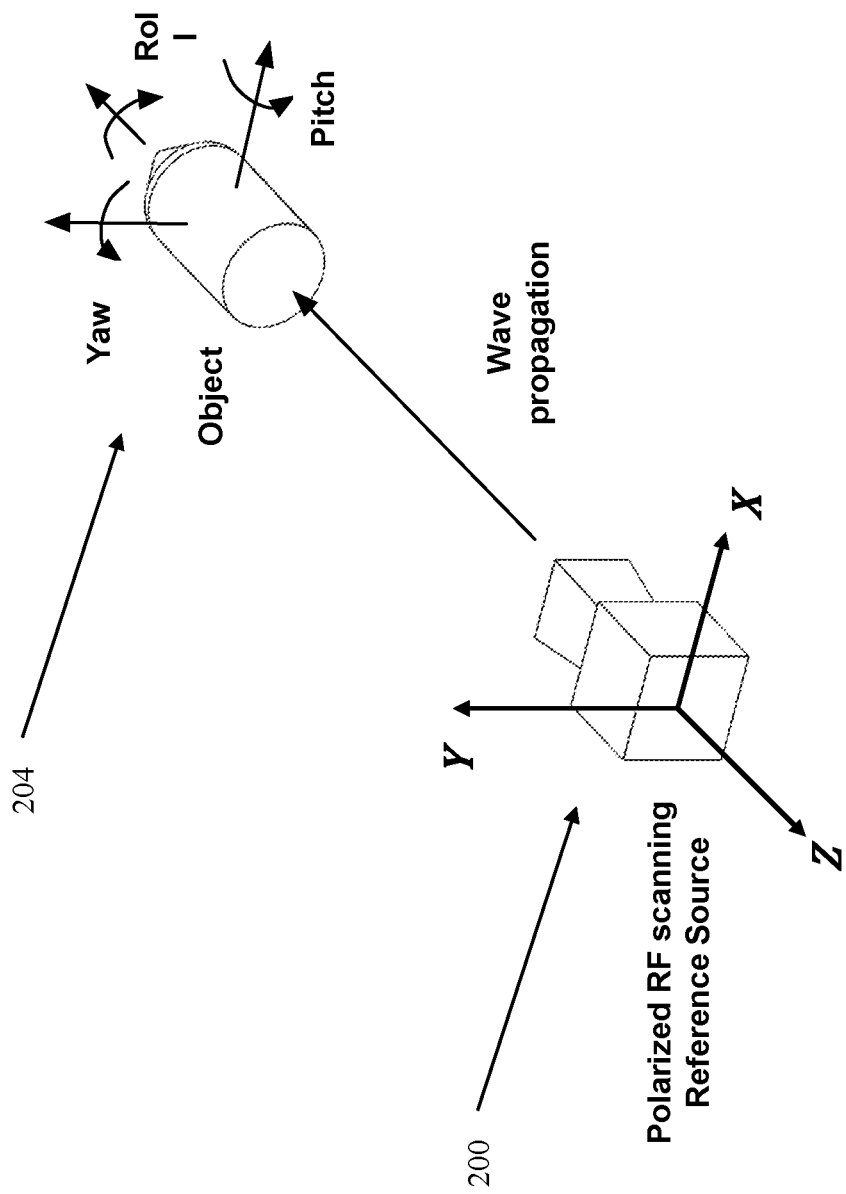
FIG. 8 illustrates the roll, pitch and yaw angles of an object as measured in the coordinate system of the polarized RF scanning reference source.

The roll, pitch and yaw angles as measured in the Cartesian coordinate system XYZ of the polarized RF scanning reference source 200 are shown in FIG. 8. As can be seen in FIG. 8, the yaw angle is measured about an axis on the object 204 that is parallel to the reference source Y axis, which is perpendicular to the direction of wave travel. Thus, by providing a cavity sensor 204 with a metallic reflecting surface 206 at 45 degrees angle in the path of propagating wave as shown in FIG. 9 (reflecting the propagating wave 90 degrees about the x axis as shown in FIG. 9), thereby causing the synchronized and polarized vector fields $E_x$ and $E_y$ to be transformed to polarized vector fields $E'_1$ and $E'_2$, respectively, and the scanning vector field $\overline{E}$ is transformed to scanning vector field $\overline{E}'$, which indicates the measured yaw angle as shown in FIG. 9.

Figure 10:
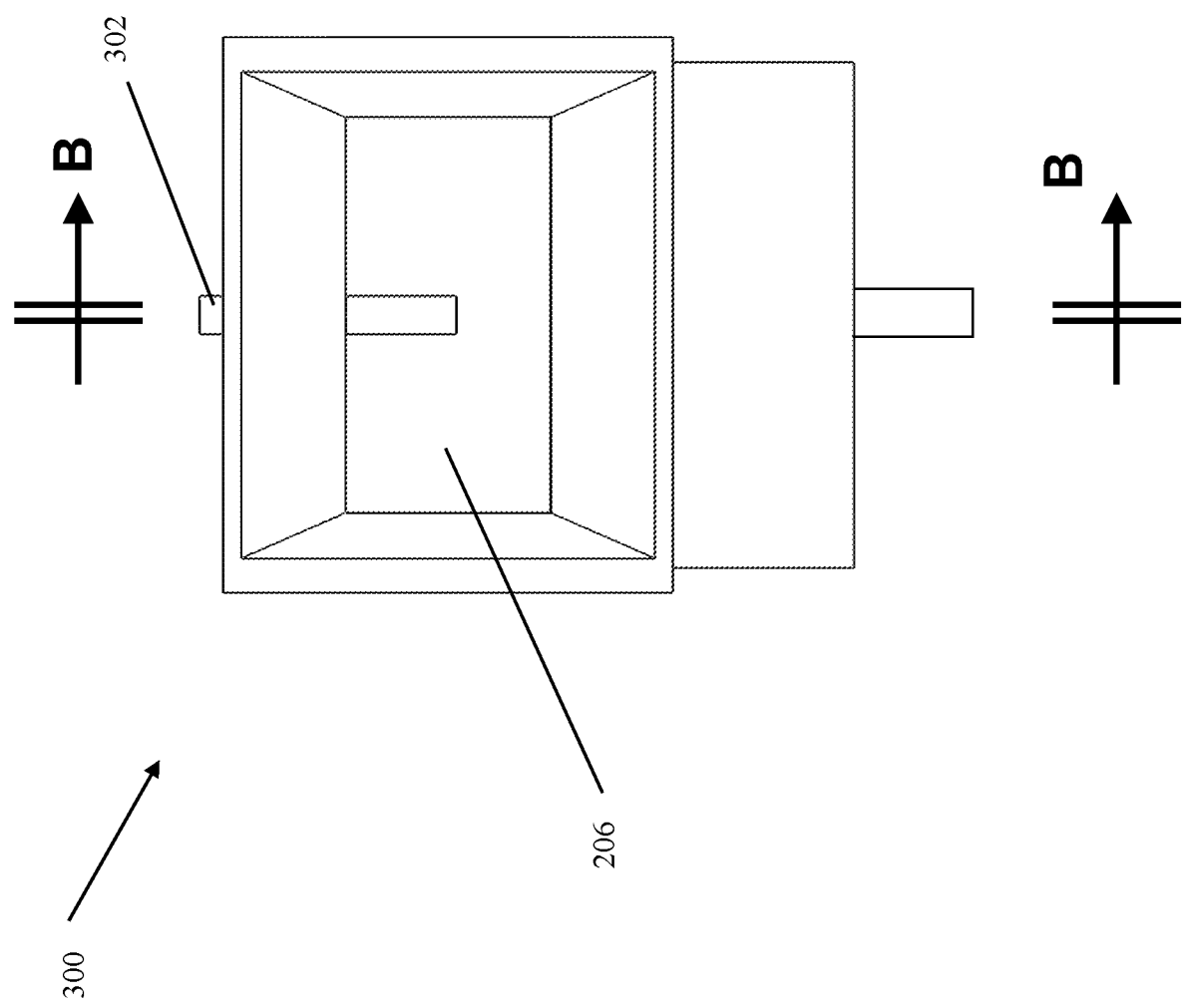
FIG. 10 illustrates the frontal view of an example of a cavity sensor that is designed for yaw angle measurement.
Figure 11:
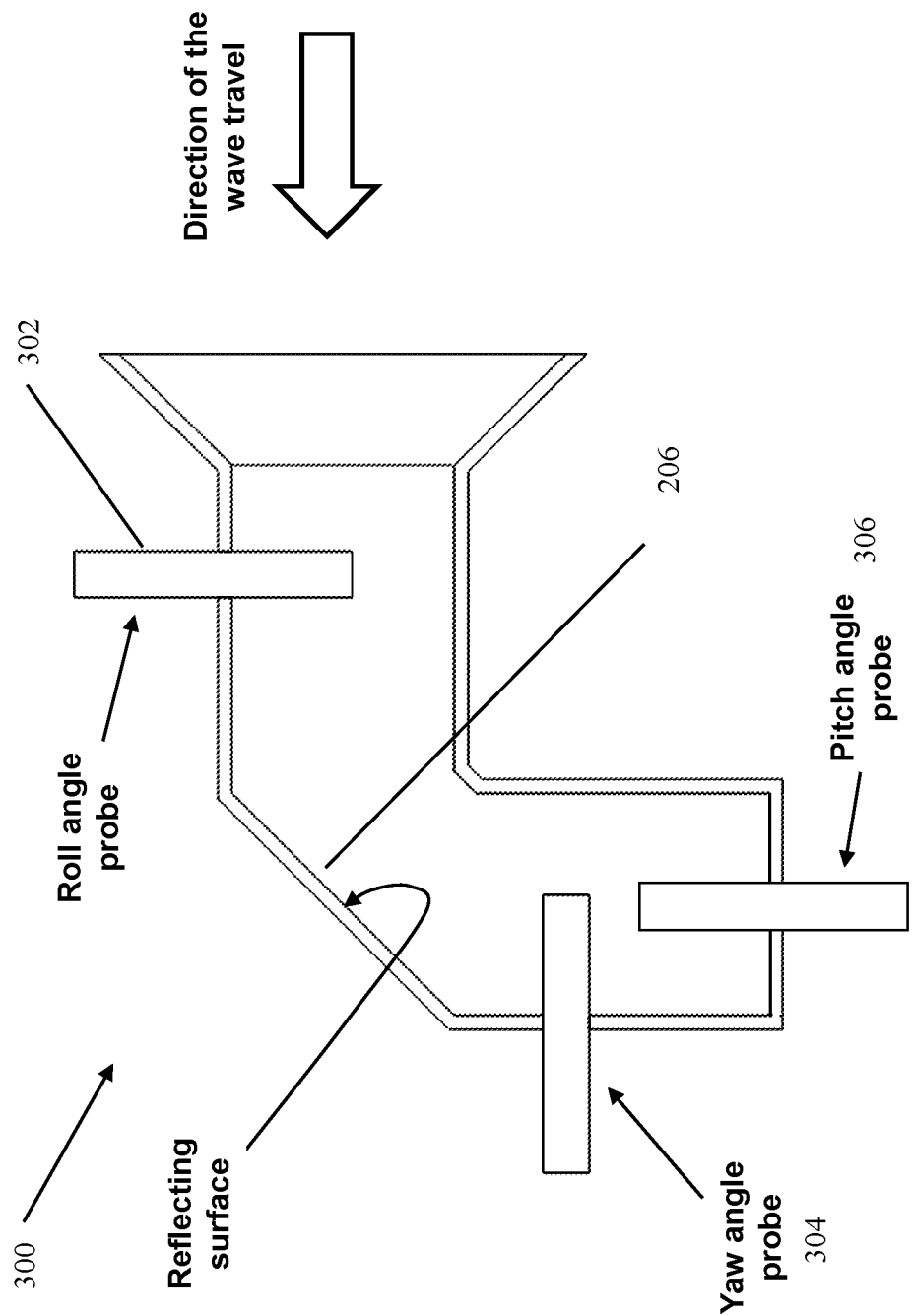
FIG. 11 illustrates cross-sectional view B-B of the cavity sensor of FIG. 10, which is designed for yaw angle measurement.

A cavity sensor 300 designed for roll and yaw angle measurement is shown in the frontal view of FIG. 10. The cross-sectional view B-B of the cavity sensor of FIG. 10 is shown in FIG. 11, with the direction of wave propagation from the reference source shown by the indicated arrow. The reflecting surface 206 and the roll angle probe 302 and yaw angle probe 304 are shown in FIG. 11, as well as a pitch angle probe 306. The cavity sensor 300 of FIGS. 10 and 11 was designed through an optimization process for high sensitivity to yaw and minimal cross-sensitivity to pitch angle of +/−5 degrees. For yaw angle measurement, the roll angle is measured independently and used together with the roll angle measured in this sensor to eliminate the effect of roll angle cross-sensitivity on the yaw angle measurement. The optimal cavity sensor was obtained using a parametric FE model of the cavity geometry and the propagated polarized RF incoming wave using ANSYS, Inc. software with added developed routines.

Figure 9:
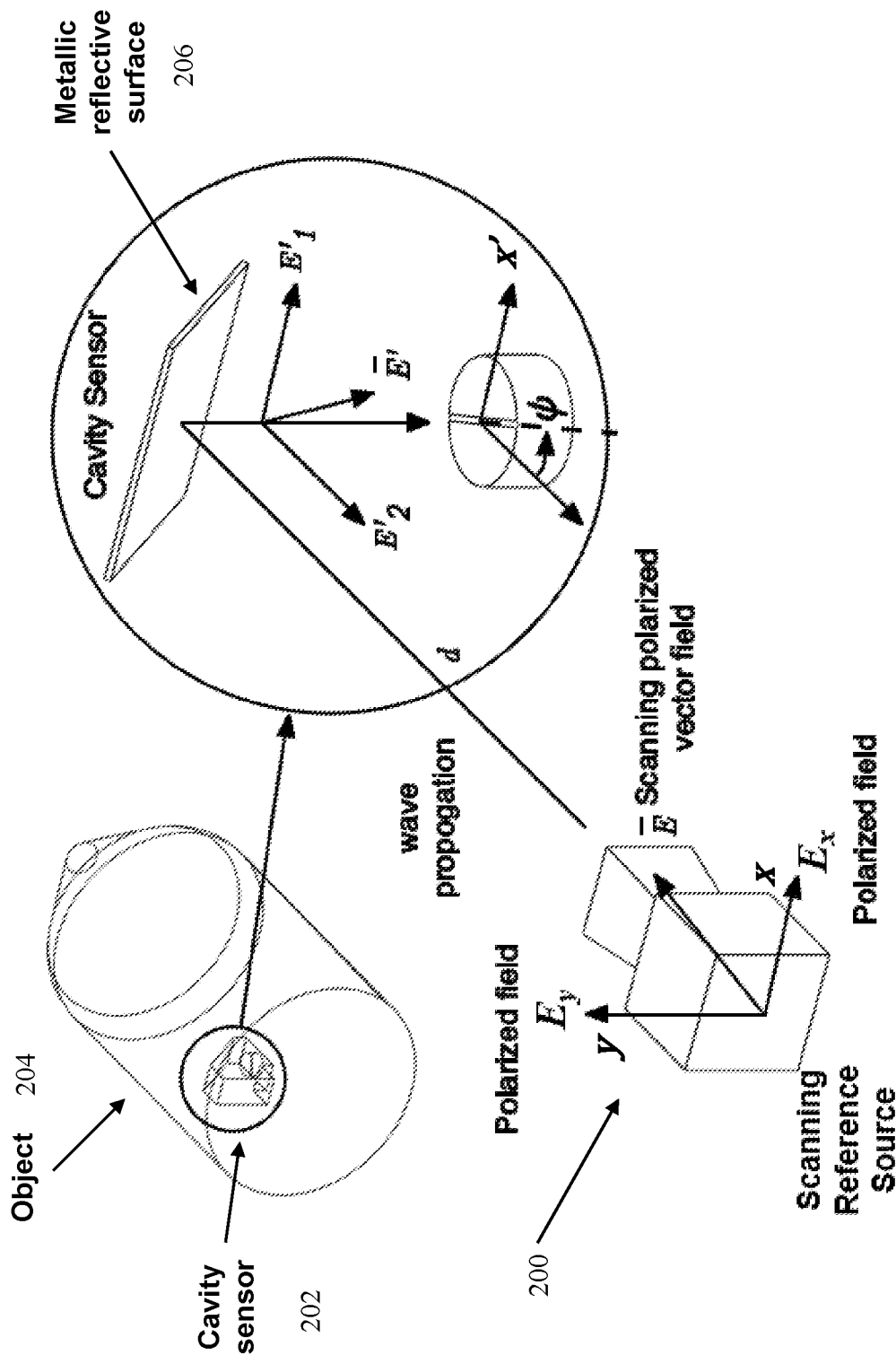
FIG. 9 illustrates the method of reflecting a polarized RF scanning electromagnetic wave by the provided metallic surface positioned at 45 degrees angle against the incoming wave for the measurement of an object yaw angle.

It is appreciated by those skilled in the art that as the cavity sensor 300 shown in FIGS. 10 and 11 rotates in pitch as indicated in FIG. 8, as can be seen in FIG. 9, scanning vector filed $\overline{E}'$ will rotate about the axis x', which will be picked up the pitch angle probe 306 shown in FIG. 11. For pitch angle measurement, the roll and yaw angles are measured independently and used together with the roll and yaw angles measured in this sensor to eliminate the effect of roll and yaw angle cross-sensitivity on the pitch angle measurement.

Figure 12:
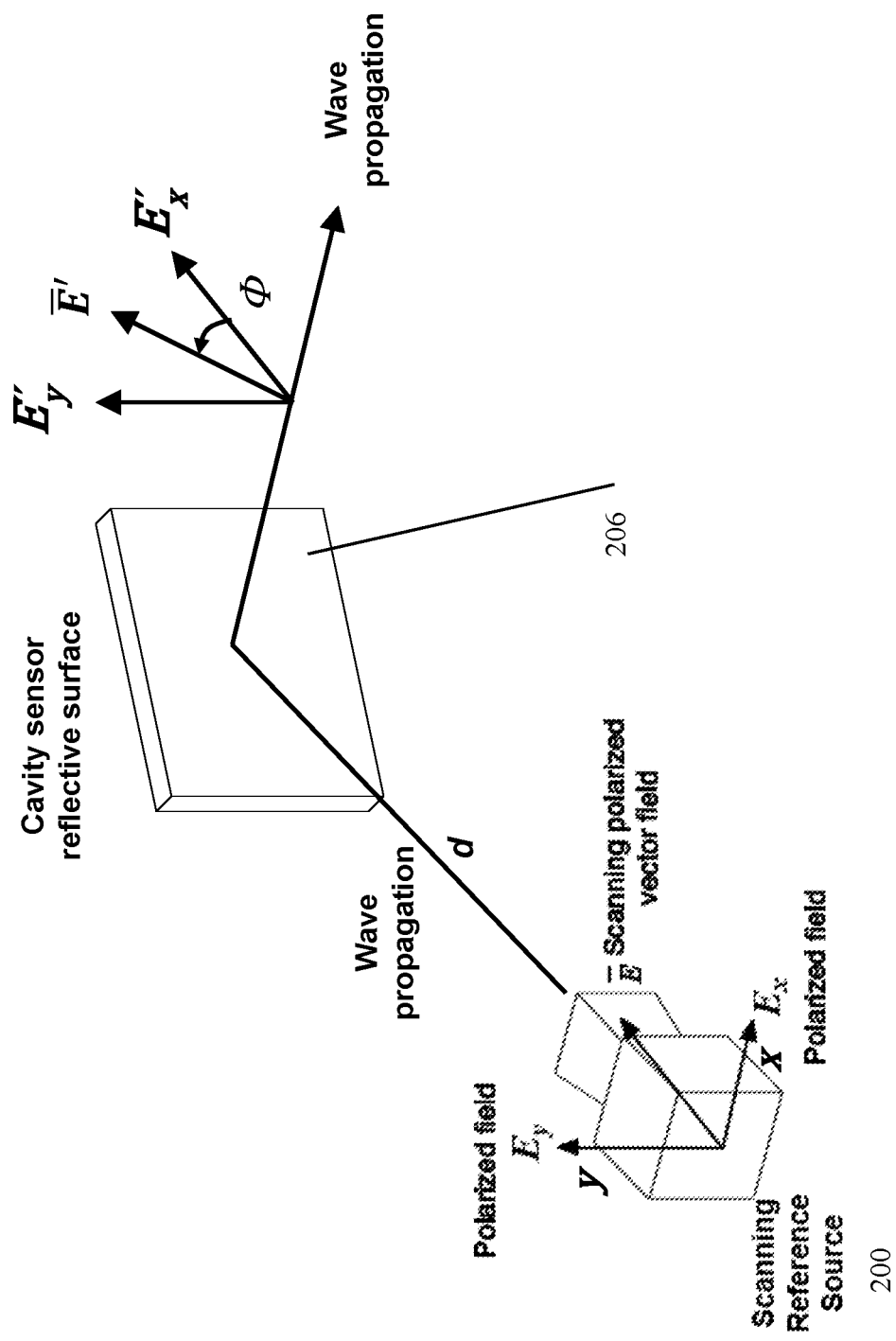
FIG. 12 illustrates the method of reflecting a polarized RF scanning electromagnetic wave by the provided metallic surface positioned at 45 degrees angle against the incoming wave for the measurement of an object pitch angle.

In another embodiment, the pitch angle is measured using the same method as the aforementioned method for yaw angle measurement, i.e., by providing a metallic reflective surface 206 at 45 degrees angle in the path of the propagating wave to reflect the wave as shown in FIG. 12 (reflecting the propagating wave 90 degrees about the y axis as shown in FIG. 9), thereby causing the synchronized and polarized vector fields $E_x$ and $E_y$ to be transformed to the polarized vector fields $E'_x$ and $E'_y$, respectively, and the scanning vector field $\overline{E}$ is transformed to scanning vector filed $\overline{E}'$, which indicates the measured yaw angle θ as shown in FIG. 12.

The cavity sensor 300 for pitch angle measurement can have a design similar to that of FIGS. 10 and 11 for yaw angle measurement, except that the cavity sensor is to be rotated 90 degrees about the direction of wave propagation shown by the arrow in FIG. 11. As a result, the indicated yaw angle sensor 304 would now measure the pitch angle.

The polarized RF scanning reference source 200 and properly configured sensor cavities can be configured function as "homing" sensors for guiding flying objects remotely to a desired location or to intercept a moving target, where the desired location or to moving target to be intercepted is designated from a fixed or mobile station.

Here, the different methods and sensory system embodiments will be described using sensor cavities used for roll angle measurement, but it will be appreciated by those skilled in the art that sensor cavities designed for pitch and/or yaw or any combination of cavity sensors designed for roll, pitch and yaw angle measurement may also be similarly configured to function as the "homing" sensors.

A method for the construction the "homing" sensory system embodiments consists of configuring the previously described cavity sensors as differential roll, pitch or yaw angle misalignment sensors for detecting angular misalignment of the object in the coordinate system of the polarized RF scanning reference source 200 (roll, and/or pitch and/or yaw misalignment with zero roll, and/or pitch and/or yaw, respectively, FIG. 8), as well as lateral and/or up and down (as seen in the schematic of FIG. 8) translational deviation (of the sensor cavities of the object—as is described below) from the YZ and/or XZ planes of the polarized RF scanning reference source, FIG. 8.

Consider the polarized RF angular orientation sensory system for roll angle measurement shown in the schematic of FIG. 4. Let the polarized RF scanning reference source 200 be fixed while the cavity sensors 202 are fixed to the flying object 204, directly facing the polarized RF scanning reference source 200 as shown in FIG. 4. In addition, instead of a single cavity sensor 202 shown on the rolling object 204 of FIG. 4, two identical cavity sensors, indicated as the cavity sensor "A" 202A and cavity sensor "B" 202B, are positioned symmetrically on the surface of the flying object facing the polarized RF scanning reference source 200 on the boom as shown in FIG. 13.

Figure 13:
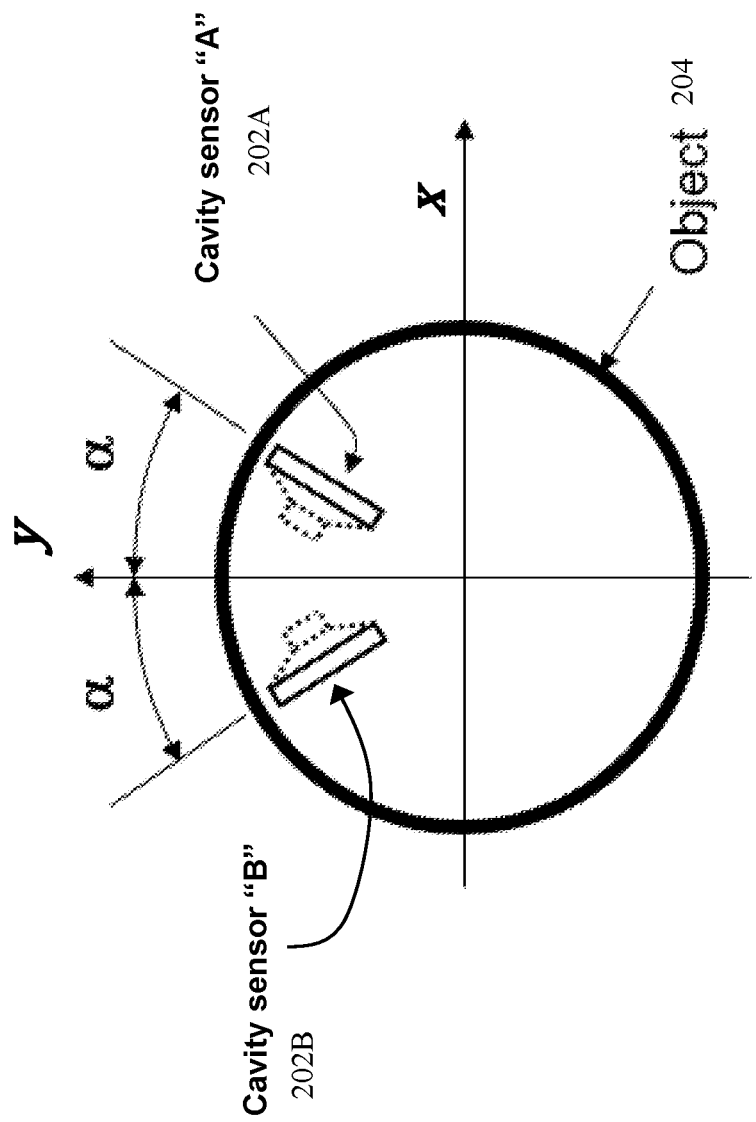
FIG. 13 illustrates the polarized RF scanning reference source and a pair of identical cavity sensors configured as roll and yaw angle misalignment sensory system of a "homing" sensory system.

The cavity sensors "A" 202A and "B" 202B shown in FIG. 13 are "horn" shaped and geometrically designed for maximum sensitivity to roll angle relative to the incoming scanning plane of polarization (the roll angle sensitivity being due to cross-polarization as well as the internal geometry of the sensor cavity). As can be seen in FIG. 13, the sensor cavities "A" 202A and "B" 202B are also slightly tilted inwards as shown by the dotted lines. Thus, the cavity sensors also have asymmetric sensitivity to rotation about the Y-axis, FIG. 4, relative to the polarized RF scanning reference source (yaw angle when the x-axis of the object and the X-axis of the polarized RF scanning reference source are parallel, FIGS. 4 and 13).

Now let the polarized RF scanning pattern of the reference source 200 be symmetric about the Y-axis of the reference source. Thus, the differential measurement of the signal received at the cavity sensor pair 202A, 202B will be zero only when the roll angle as well as the yaw angle of the object 204 relative to the polarized RF scanning reference source 200, FIGS. 4 and 13. Therefore, the differential output of the cavity sensor pair 202A, 202B will be zero only if the X-axis of the polarized RF scanning reference source 200, FIG. 4, is parallel with the x-axis of the object 204, FIG. 14, and the plane Y-Z of the polarized RF scanning reference source 200, FIG. 4, and the object fixed y-z plane, FIG. 13, are parallel, i.e., when the object 204 has zero roll and yaw angles relative to the reference source but may have a pitch angle relative to the reference source 200. The distance between the Y-Z and y-z planes may also be non-zero. It is noted that in FIGS. 4 and 13 the axes Z and z are not shown for the sake of illustration clarity, but are readily identifiable for the Cartesian coordinate systems XYZ of the polarized RF scanning reference source and xyz of the object using the right-hand rule.

Figure 14:
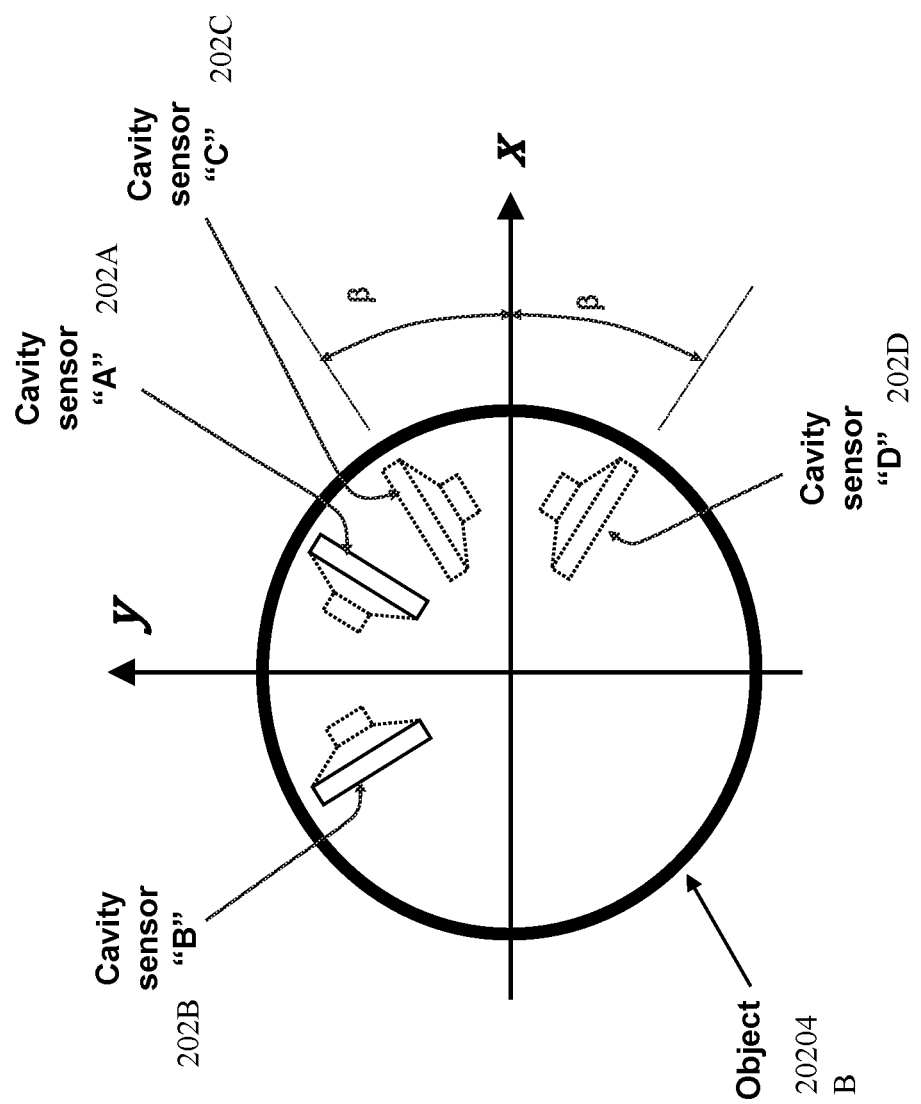
FIG. 14 illustrates the polarized RF scanning reference source with the pair of cavity sensors of FIG. 13, with the added two identical cavity sensors configured as roll and pitch angle misalignment sensory system of a "homing" sensory system.

Now if we add a second similar pair of identical cavity sensors "C" 202C and "D" 202D to the object 204 of FIG. 13 and position them symmetrically about the x-axis as shown in FIG. 14 with dashed lines, the differential output of the second pair of cavity sensors 202C, 202D to a polarized RF scanning pattern of the reference source 200 that is symmetric about the X-axis of the polarized RF scanning reference source 200 becomes zero only if the roll angle as well as the pitch angle of the object 204 relative to the reference source 200 are zero as was similarly described for the differential output of the cavity sensors "A" 202A and "B" 202B.

Therefore, the differential output of the second cavity sensor pair "C" and "D" 202C and 202D will be zero only if the Y-axis of the polarized RF scanning reference source 200, FIG. 4, is parallel with the y-axis of the object 204, FIG. 14, and the X-Z and x-z planes are in parallel, i.e., the object has zero roll and pitch angles relative to the polarized RF scanning reference source 200, but may have a yaw angle relative to the reference source 200. The distance between the parallel X-Z and x-z planes may also be non-zero.

It will be appreciated by those skilled in the art that with the described design of the polarized RF scanning reference source 200, it is possible to sequentially scan each sensor cavity pair 202A, 202B and 202C, 202D with scanning patterns that are symmetric about their axes of symmetry. Therefore, the sensory system can provide the desired measure of angular misalignment between the polarized RF scanning reference source 200, FIG. 4, and the object 204, FIG. 14, with a single polarized RF scanning reference source 200.

The differential signal measurement from the above two cavity sensor pairs 202A, 202B and 202C, 202D provides a measure of pitch, yaw and roll misalignment between the polarized RF scanning reference source 200 and the object 204. Hereinafter, the system consisting of the polarized RF scanning reference source 200, FIG. 4, and the two pairs of identical cavity sensors 202A, 202B and 202C, 202D, FIG. 14, that are configured to measure pitch, yaw and roll misalignments is referred to as "angular misalignment sensory system". It is appreciated by those skilled in the art that this system may be used with only one pair of cavity sensors "A" 202A and "B" 202B or the pair "C" 202C and "D" 202D to only measure angular misalignment in roll and yaw or roll and pitch, respectively.

In the schematic of FIG. 14 the pair of identical cavity sensors "A" 202A and "B" 202B and the pair of identical cavity sensors "C" 202C and "D" 202D are shown to be identical. However, it will be appreciated by those skilled in the art that the two pairs do not have to be identical as long as they are oriented symmetrically about the YZ and XZ planes, respectively, they can provide the above angular misalignment measures.

When the object 204 is provided with an active control system that is used for its guidance towards a fixed location or a moving target, the control system can use the differential measurements as error signals to be minimized to align the object to zero roll, yaw and pitch angle relative to the Cartesian coordinate system XYZ of the polarized RF scanning reference source 200, FIG. 4.

It will also be appreciated by those skilled in the art that the strength of the signal received at each cavity sensor of the above cavity sensor pairs, i.e., the signal strength at any one of the four cavity sensors "A" 202A, "B" 202B, "C"

202C and "D" 202D provides a measure of the distance between the polarized RF scanning reference source 200 and the object 204. Then when the object 204 is provided with an active control system that is used for its guidance towards a fixed location or a moving target, the control system can use the aforementioned "angular misalignment sensory system" and the measure of distance (as a distance error) to be minimized (negative value of the magnitude of the indicated measure of distance to increase and drive the object 204 towards the fixed or moving target and away from the polarized RF scanning reference source 200—or positive value of the magnitude of the indicated measure of distance to decrease the distance between the object 204 and the polarized RF scanning reference source 200).

It will also be appreciated by those skilled in the art that instead of using the magnitude of the signal at only one of the cavity sensors "A" 202A, "B" 202B, "C" 202C or "D" 202D, a better measure of distance is generally an average of the magnitudes of the signals measured at least at two of the cavity sensors since it would minimize variations due to inevitable angular motions of the object 204 during the flight (such as wobbling in munitions during the flight) or ground motion.

It will also be appreciated by those skilled in the art that when the "angular misalignment sensory system" and the aforementioned distance measure are used for bringing the object 204 as shown in FIGS. 4 and 14 towards the polarized RF scanning reference source 200, e.g., for the purpose of mating two parts or bringing a UAV or UGV "home", since the distance between the cavity sensors 202 and the polarized RF scanning reference source 200 at their intended and final relative positioning is known, and since the magnitudes of the signal at all four cavity sensors at the final relative positioning are known a priori, an accurate measurement of distance between the object 204 and the polarized RF scanning reference source 200 can be readily calculated. In practice, however, one would only require a measure of distance between the object 204 and the reference source 200 and its rate of change (rate of decrease in the distance) to close a control loop—manually or automatically—to achieve guidance of the object 204 to its intended relative positioning ("homing" or "engaging" or "mating" positions, depending of the nature of the object and the receptacle on the reference source side). In addition, auxiliary sensors indicating full engagement, such as optical sensors or mechanical mating guides, etc., may also be provided depending on the application to ensure proper engagement and for safety reasons.

In the description of the pairs of identical sensor cavities of FIGS. 13 and 14 the cavity sensors were shown to be located at the same radial distance from the origin of the provided coordinate system. In practice, however, each pair may be located at a different radial distance from the origin of the coordinate system fixed on the object 204 as were as long as they are symmetrically positioned to indicate zero roll angle with a symmetrically scanning reference pattern.

In the above descriptions of the "angular misalignment sensory system" with and without the distance measure for guidance control of the object towards the desired location or towards a fixed or moving object, the polarized RF scanning reference source 200 was considered to be fixed. However, the polarized RF scanning reference source 200 may be mobile, for example, being held by the "target designator" and used to manually orient the polarized RF scanning reference source 200 to guide the object 204 in the direction of target intercept. During this process, the "target designator" can readily "command" the object 204 to make a turn a certain amount, e.g., to the right, by rotating the polarized RF scanning reference source 200 the same amount to the right (counterclockwise about the Y-axis, FIG. 8, if the object 204 is traveling in a plane parallel to the XZ plane).

In one embodiment, the "target designator" is a human and is carrying the polarized RF scanning reference source 200, preferably as mounted on a support such as a tri-pod with a ball joint to allow its rotary motions for directional stability, in which the "target designator" views the object 204 and the target with or without optical aids, and directs the object 204 (equipped for operating with the present "angular misalignment sensory system" and provided with active guidance and control) towards the target by proper rotation of the polarized RF scanning reference source 200.

In another embodiment, the polarized RF scanning reference source 200 is provided with rotary actuators that are controlled by a central control system, hereinafter indicated as the "target intercept controller". In this system, the "target designator" indicates the target through a vision system. The vision system directly or through the target designator also identifies the location of the guided object 204, and uses the information to generate a control signal for orienting the polarized RF scanning reference source 200 in an established closed loop control system in the "target intercept controller" to intercept the fixed or moving target.

In the above embodiments, the polarized RF scanning reference source 200 is essentially fixed and the object 204 is in motion (in flight or moving on the ground or on water), FIGS. 4 and 8. In an alternative embodiment, the object 204 is mounted on a fixed or mobile platform by an orientationally actuated mechanism that is operated by a controller system, which forms an "angular misalignment sensory system" with a remotely positioned polarized RF scanning reference source 200. The operator of the polarized RF scanning reference source can then manually or automatically remotely orient the object 204 in the desired direction. Here, the operator is not intended to refer only to a human operator but it might also consist of an automated target acquisition/recognition system, such as one that uses radar or a visual target pattern recognition system or the like.

Alternatively, in an "angular misalignment sensory system" both indicated polarized RF scanning reference source 200 component and the object 204 component, FIGS. 4 and 8, may be mobile and the signal generated by the "angular misalignment sensory system" is used to manually or automatically bring the two components 200, 204 to a desired relative positioning ("homing"), such as to mate the two components or place one inside the other or the like. In this embodiment, the previously described distance measure (the magnitude of the signal measured at any one of the cavity sensors "A" 202A, "B" 202B, "C" 202C or "D" 202D or their average or the like and the corresponding known (calibrated) magnitude(s) of the sensor signal at the desired relative positioning of the two components 200, 204 of the "angular misalignment sensory system". Here, it will be appreciated that the relative positioning of the two components 200, 204 of the "angular misalignment sensory system" refers to both their relative distance and orientation positioning.

Figure 16:
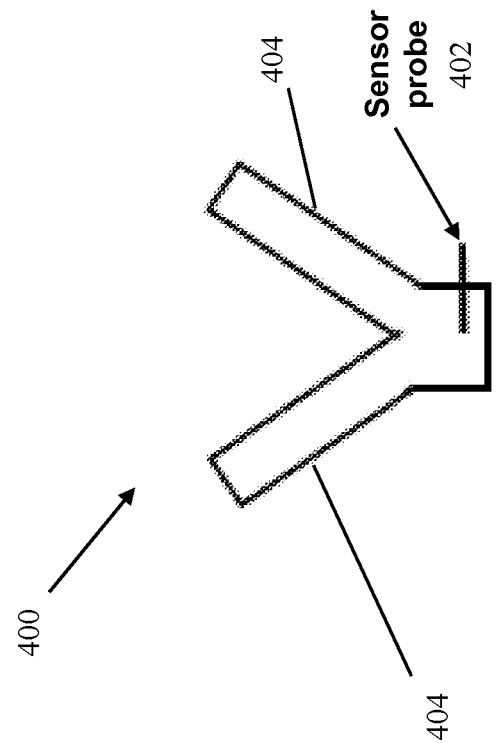
FIG. 16 illustrates the cross-sectional view C-C of the integrated pair of differential angular orientation misalignment measuring cavity sensor of FIG. 15.
Figure 15:
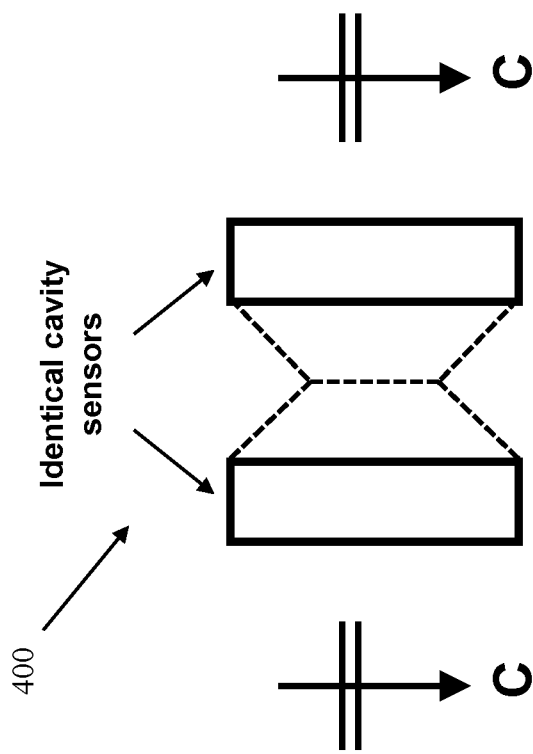
FIG. 15 illustrates an example of the design of an integrated pair of differential angular orientation misalignment measuring cavity sensor.

In the schematics of FIGS. 13 and 14 the pairs of symmetrically positioned identical cavity sensors are shown to be constructed with two separate cavity sensor sides 404. Each pair may, however, be constructed as a single cavity with a single pick-up terminal as shown in FIG. 15 and its cross-sectional view C-C shown in FIG. 16. Such a design of an integrated pair of differential angular orientation misalignment measuring cavity sensor 400 would significantly simplifying the sensor construction and its required electronics. FIG. 15 shows the frontal view of the integrated sensor pair as it would have been viewed in the frontal views of FIG. 13 or 14. The cross-sectional view C-C of the integrated sensor is shown in FIG. 15, also showing the location of the sensor pick-up probe 402. Alternatively, two pick-up probes, each symmetrically positioned in each cavity as shown in FIG. 11 for roll angle measurement may be provided to provide signal magnitude measurement in each cavity to provide a measure of distance between the object and the polarized RF scanning reference source as was previously described. The differential measurement of the signal provides a measure of angular misalignment as was previously described.

It will be appreciated by those skilled in the art that numerous symmetrical cavity sensor geometries can also be designed to provide the differential sensory information of the cavity sensor pairs of FIGS. 13 and 14. In fact, both pairs of cavity sensors of FIG. 14 can be combined into a single geometrical cavity with one or two pick-up probes (not shown) for full roll, pitch and yaw angle misalignment measurement. An example of such a combined cavity sensor 450 is shown in frontal view of FIG. 17. This cavity sensor 450 is constructed as a simple integration of two cavity sensors of the geometry shown in FIG. 15, one of which is rotated 90 degrees and symmetrically positioned as shown in FIG. 17. The four cavity sides 404 are combined as shown in the cross-section of FIG. 16 and the pick-up probe 402 of the sensor is positioned at 45 degrees as shown in FIG. 17 inside the cavity sensor base similar to that shown in FIG. 16. As a result, the differential reading from both integrated pairs of cavity sensors have to be zero for the object to be at zero pitch, yaw and roll angles relative to the polarized RF scanning reference source, FIG. 8. Separate pick-up terminal can be provided for magnitude (distance) indication. Other pick-up terminals similar to those shown in the cavity sensor of FIG. 11 for roll angle measurement may also be provided to make the angular orientation measurements as was previously described. The use of one pick-up probe may, however, not be desirable since it must be positioned to be sensitive to both pairs of differential cavity sensors, thereby requiring a higher transmitted power level for the same sensor output.

It will appreciated by those skilled in the art that when the disclosed roll angular orientation cavity sensor of FIG. 9-11 is used in a spinning object such as a spinning munitions, only one such sensor cavity is generally required to measure both yaw and pitch angles since as the object rotates from the position of measuring the yaw angle 90 degrees, the cavity sensor indicates the object pitch angle.

In a spinning object, such as a spinning round, the differential roll angle sensor cavity pairs like the one shown in FIG. 11 have zero output each time the roll angle is either zero or 180 degrees. As a result, by measuring the time that it takes for the differential measurements to go through zero outputs the spin rate of the round can be determined.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A cavity sensor comprising:
    a body defining a cavity, the cavity having an opening on one end and a closed surface on other end;
    a reflective surface disposed in the cavity, the reflective surface being angled 45 degrees relative to a propagation direction of an incoming wave through the opening; and
    first and second angle probes positioned on each of two ends of the reflective surface.

2. The cavity sensor according to claim 1, further comprising a horn positioned around the opening.

3. The cavity sensor according to claim 1, further comprising a third probe positioned on the closed surface of the cavity.

4. A cavity sensor comprising:
    a body defining a cavity, the body having two or more conduits, a first end of each of the two or more conduits having an opening, the body having a second end having a closed surface, the body further having a common conduit in communication with each of the two or more conduits, and
    a probe positioned in the cavity at the common conduit.

5. The cavity sensor according to claim 4, wherein the two or more conduits comprises two conduits symmetrically positioned about the common conduit.

6. The cavity sensor according to claim 4, wherein the two or more conduits comprises two pairs of conduits, each pair of the two pairs being symmetrically positioned about the common conduit.

7. The cavity sensor according to claim 6, wherein the probe is positioned the common conduit adjacent to the closed surface.

8. The cavity sensor according to claim 7, wherein the probe is positioned 45 degrees relative to a centerline of one of the two pairs of conduits.

* * * * *